US011875962B2

(12) United States Patent
Enriquez et al.

(10) Patent No.: US 11,875,962 B2
(45) Date of Patent: Jan. 16, 2024

(54) PROTECTION DEVICE INCLUDING MULTI-PLANE FUSIBLE ELEMENT

(71) Applicant: Littelfuse, Inc., Chicago, IL (US)

(72) Inventors: Albert Enriquez, Malvar (PH); Lily Espenilla Rosios, Malvar (PH); Arnel Ramos, Cabuyao (PH)

(73) Assignee: Littelfuse, Inc., Chicago, IL (US)

(*) Notice: Subject to any disclaimer, the term of this patent is extended or adjusted under 35 U.S.C. 154(b) by 0 days.

(21) Appl. No.: 17/974,015

(22) Filed: Oct. 26, 2022

(65) Prior Publication Data

US 2023/0162939 A1 May 25, 2023

Related U.S. Application Data

(60) Provisional application No. 63/282,313, filed on Nov. 23, 2021.

(51) Int. Cl.

*H01H 85/08* (2006.01)
*H01H 85/143* (2006.01)
*H01H 85/20* (2006.01)

(52) U.S. Cl.

CPC .......... *H01H 85/143* (2013.01); *H01H 85/08* (2013.01); *H01H 85/20* (2013.01)

(58) Field of Classification Search

CPC ......... H01H 85/0411; H01H 85/08–11; H01H 85/143; H01H 85/20; H01H 2085/0412–0414

See application file for complete search history.

(56) References Cited

U.S. PATENT DOCUMENTS 3,291,943 A * 12/1966 Kozacka ................ H01H 85/10 337/276
3,319,028 A * 5/1967 Kozacka .............. H01H 85/055 337/228
4,319,213 A * 3/1982 Reid ...................... H01H 85/12 337/159
4,651,119 A * 3/1987 Belcher ................ H01H 85/055 337/297

(Continued)

FOREIGN PATENT DOCUMENTS

CN 111223729 A 6/2020
EP 2955739 A1 12/2015
GB 813643 A 5/1959

OTHER PUBLICATIONS

European Search Report and Written Opinion for the European Application No. EP22208668, dated Apr. 5, 2023, 6 pages.

*Primary Examiner* — Jacob R Crum
(74) *Attorney, Agent, or Firm* — KDW Firm PLLC

(57) ABSTRACT

Disclosed are various protection devices and associated methods. In some embodiments, a protection device may include a substrate and a fusible element coupled to the substrate, wherein the fusible element may include a first end opposite a second end, and wherein the first and second ends wrap around the substrate. The fusible element may further include a central section comprising a plurality of segments connected end-to-end in a continuous arrangement between the first and second ends, wherein a first set of segments of the plurality of segments extends along a first plane, and wherein a second set of segments of the plurality of segments extends along a second plane, different than the first plane.

9 Claims, 13 Drawing Sheets

(56) References Cited

U.S. PATENT DOCUMENTS

| | | | | | |
|---|---|---|---|---|---|
| 5,699,032 | A * | 12/1997 | Ulm, Jr. | H01H 85/0411 | 337/404 |
| 6,160,471 | A * | 12/2000 | Rybka | H01H 85/055 | 337/276 |
| 2011/0063070 | A1 * | 3/2011 | Dietsch | H01H 85/0411 | 337/290 |
| 2015/0235798 | A1 * | 8/2015 | Takamura | H01H 85/36 | 337/295 |
| 2018/0025879 | A1 | 1/2018 | Ho | | |

* cited by examiner

PROTECTION DEVICE INCLUDING MULTI-PLANE FUSIBLE ELEMENT

CROSS REFERENCE TO RELATED APPLICATION

This application claims the benefit of priority to, U.S. Provisional Patent Application No. 63/282,313, filed Nov. 23, 2021, entitled "Protection Device Including Multi-Plane Fusible Element," which application is incorporated herein by reference in its entirety.

FIELD OF THE DISCLOSURE

The present disclosure is generally related to the field of protection devices. More particularly, embodiments of the present disclosure relate to protection devices including a multi-plane fusible element.

BACKGROUND OF THE DISCLOSURE

Fuses are typically used as circuit protection devices and form an electrical connection with a component in a circuit to be protected. The fuse protects the circuit by intentionally being a point of first failure. One type of fuse includes a housing consisting of a plastic base and a plastic cap with a pair of conductors or terminals which extend through the base and are connected via a fusible element that forms a bridge between the terminals inside the housing.

In certain circuit protection applications (e.g., motors), a surge current or short term current overload situation may typically occur until a steady state condition for the device is achieved. Fuses employed in these types of circuits must be designed to permit this short term surge to pass through the fuse without melting the fusible element. This high-surge condition is defined in terms of current and time ($I^2t$) where it is desirable to avoid an open circuit unless the current exceeds a specific percentage of the fuse's rated current.

Some fuses employ a spiral wound fuse element. In particular, the fuse element comprises a core of twisted fibers with a fuse wire or wound around the core in a spiral pattern. The fibers that make up the core is typically a ceramic material that is devoid of any material that could become conductive when the fuse is blown. The wound wire may include a plurality of wire strands configured to provide increased heat absorption indicative of, for example, a slow-blow or time-delayed fuse.

When a circuit overload is encountered, the passage of the excess current through the fuse element causes it to generate heat and thereby elevate the temperature of the fuse wire. In other words, the core acts as a heat sink to draw this heat away from the fuse wire, thereby lowering the temperature of the fuse wire. In this manner, the transfer of heat from the fuse wire to the core lengthens the time required before the fuse wire melting temperature is reached. For higher current-rated fuses, a larger diameter fuse wire is used to withstand higher current passing through the wire and therefore higher temperatures. However, the wound fuse wire is limited in size, thereby limiting the amount of excess current the wire can withstand as well as the amount of heat transfer between the wound wire and the core. Although a single element-termination with a stamped element design resolves some of the issues with spiral wound fuse elements, the overall length of the element is limited due to space constraints of the fuse.

Accordingly, there is a need for a fuse that utilizes a fusible element to provide high I2t characteristics on the fuse element that will withstand high surge current associated with inductive and capacitive loads to protect particular types of circuit components and associated circuits.

SUMMARY OF THE DISCLOSURE

The Summary is provided to introduce a selection of concepts in a simplified form, the concepts further described below in the Detailed Description. The Summary is not intended to identify key features or essential features of the claimed subject matter, nor is the Summary intended as an aid in determining the scope of the claimed subject matter.

In one approach, a protection device may include a substrate and a fusible element coupled to the substrate, wherein the fusible element may include a first end opposite a second end, and wherein the first and second ends wrap around the substrate. The fusible element may further include a central section comprising a plurality of segments connected end-to-end in a continuous arrangement between the first and second ends, wherein a first set of segments of the plurality of segments extends along a first plane, and wherein a second set of segments of the plurality of segments extends along a second plane, different than the first plane.

In another approach, a fusible element for a protection device may include a first end opposite a second end, wherein the first and second ends are operable to wrap around a substrate, and a central section comprising a plurality of segments connected end-to-end in a serpentine pattern between the first and second ends, wherein a first set of segments of the plurality of segments extends along a first plane, and wherein a second set of segments of the plurality of segments extends along a second plane, different than the first plane.

BRIEF DESCRIPTION OF THE DRAWINGS

The accompanying drawings illustrate exemplary approaches of the disclosed embodiments so far devised for the practical application of the principles thereof, and wherein.

Figure 1:
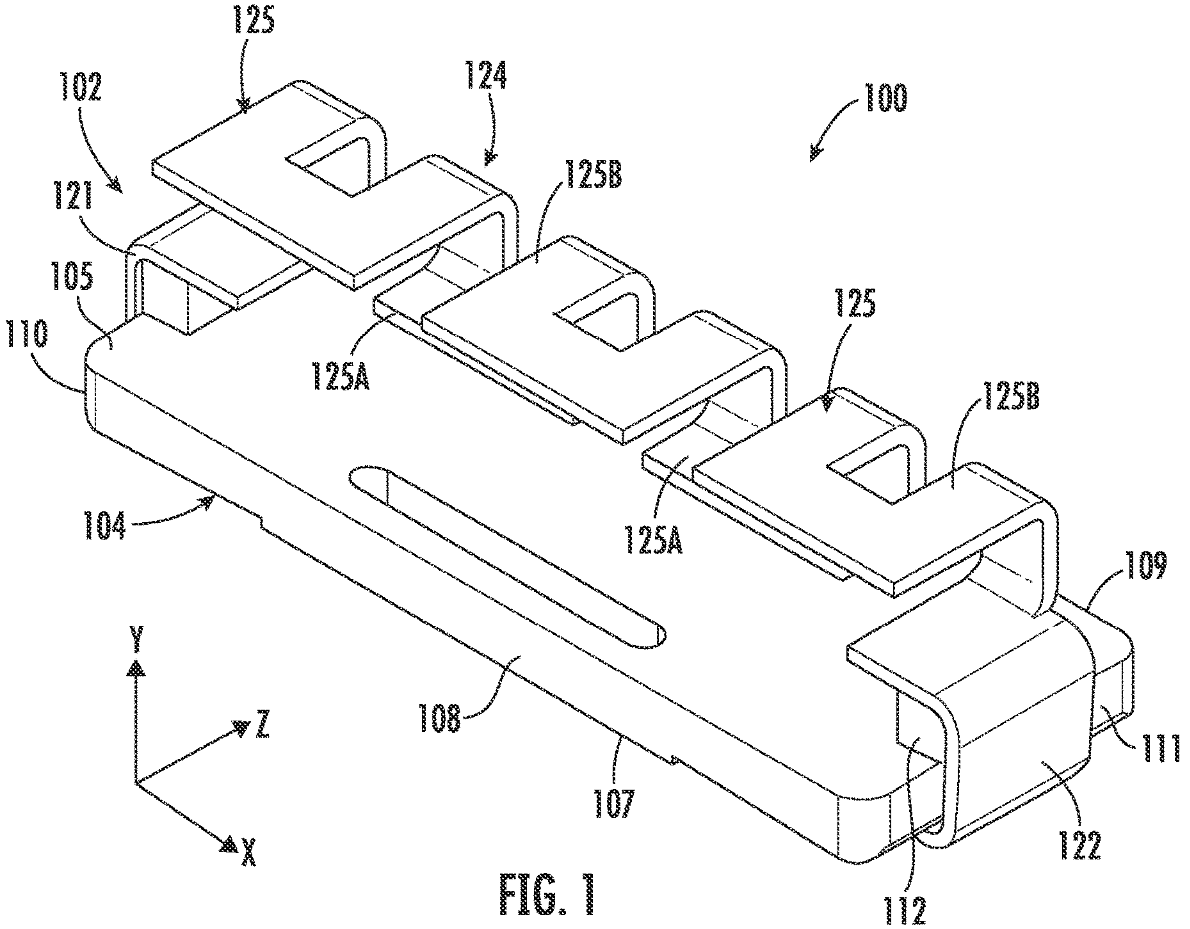
FIG. 1 depicts a perspective view of a protection device according to embodiments of the present disclosure.

The drawings are not necessarily to scale. The drawings are merely representations, not intended to portray specific parameters of the disclosure. The drawings are intended to depict exemplary embodiments of the disclosure, and therefore are not to be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DETAILED DESCRIPTION

Protection devices, fuse assemblies, and methods in accordance with the present disclosure will now be described more fully hereinafter with reference to the accompanying drawings, where embodiments are shown. The protection devices, fuse assemblies, and methods may be embodied in many different forms and are not to be construed as being limited to the embodiments set forth herein. Instead, these embodiments are provided so the disclosure will be thorough and complete, and will fully convey the scope of the disclosure to those skilled in the art.

As noted above, common slow-blow fuses use a wound wire design to meet the I2t requirements of the device. However, this option has known challenges on the solder-joint reliability. While a single element-termination with a stamped element design may resolve this issue, the length of element is limited. The present disclosure caters both to the need for longer elements and robust termination.

In some embodiments, a multi-plane serpentine series element is provided as the fusible element. The fusible element may start with a metal sheet, which is formed with a serpentine/spiral or any element pattern via etching or cutting, and intentionally designed to be longer and exceed the fuse body width dimension. Once configured, the fusible element may extend along multiple planes above a substrate of the body. In some embodiments, a selective molding of silicone filler may be applied on the fuse element, sparing the element weak-spot for arc quenching purposes and keeping the element in-place and the pattern intact.

It will be appreciated that at least the following technical and functional advantages are provided by the embodiments of the present disclosure. Firstly, the folded fusible element structure maximizes the length of the fusible element that can fit on a space constrained body. Secondly, a higher resistance capability may be provided for low current. Thirdly, the longer element length allows room for higher I2t values. Fourthly, selective molding of the silicone filler enhances fuse breaking capacity while maintaining the OL performance. Fifthly, higher reliability may be provided with a robust, solderless termination. Sixthly, placement of the fusible element is easier as compared to wire, therefore simplifying assembly and increasing throughput. The following will further detail these and other advantages of the present disclosure.

FIG. 1 depicts a protection device (hereinafter "device") 100 according to embodiments of the present disclosure. As shown, the device 100 may include a fuse assembly 102 including a fusible element 120 coupled to a substrate (e.g., printed circuit board) 104 and partially enclosed by a cover (not shown). Although not limited to any particular shape or configuration, the substrate 104 may include an upper surface 105 opposite a lower surface 107, a first side 108 opposite a second side 109, and a first end 110 opposite a second end 111. At each of the first and second ends 110, 111 may be a shoulder 112 extending vertically (e.g., along the y-direction) away from the upper surface 105 of the substrate 104. The fusible element 120 may be directly coupled to, and wrap around, the shoulders 112 at the first and second ends 110, 111 of the substrate 104. The substrate 104 may have an overall length extending in the x-direction, an overall width extending in the z-direction, and an overall height or thickness extending in the y-direction.

As shown, the fusible element 120 may include a first end 121 opposite a second end 122, wherein the first and second ends 121, 122 operate as electrical terminals. The first end 121 and the second end 122 may be in direct contact with the shoulders 112 and the lower surface 107 of the substrate 104. Between the first end 121 and the second end 122 is a central section 124 comprising a plurality of segments 125 connected end-to-end in a continuous arrangement. As will be described in greater detail herein, the central section 124 may be arranged in a looping or serpentine pattern, which extends along multiple planes. For example, a first set of segments 125A of the plurality of segments 125 extends along a first plane, while a second set of segments 125B of the plurality of segments 125 extends along a second plane, different than the first plane. As used herein, each segment 125 may correspond to a length or portion of the central section having a bend at one or both ends. As shown and described herein as being straight, or substantially straight, the segments 125 also be curved, sloped, or bent. Embodiments herein are not limited in this context.

In accordance with known electrical fuses, the fusible element 120 is constructed to melt, vaporize, disintegrate or otherwise structurally fail when a predetermined magnitude of electrical current flows through the fuse for a duration of time, sometimes referred to as an overcurrent condition, that may damage sensitive electronic components. That is, the current path through the fuse assembly 102 is designed to fail and open the current path through the fusible element 120 to avoid damage to sensitive circuit components. The amount of current that the fusible element 120 may sustain before opening the current path may vary depending on its particular material properties and dimensional aspects. Various fuse link or fuse element constructions are known for such a purpose. Once the fusible element 120 is opened, the fuse assembly 102 may be replaced to restore the electrical circuitry to full operation.

Figure 2:
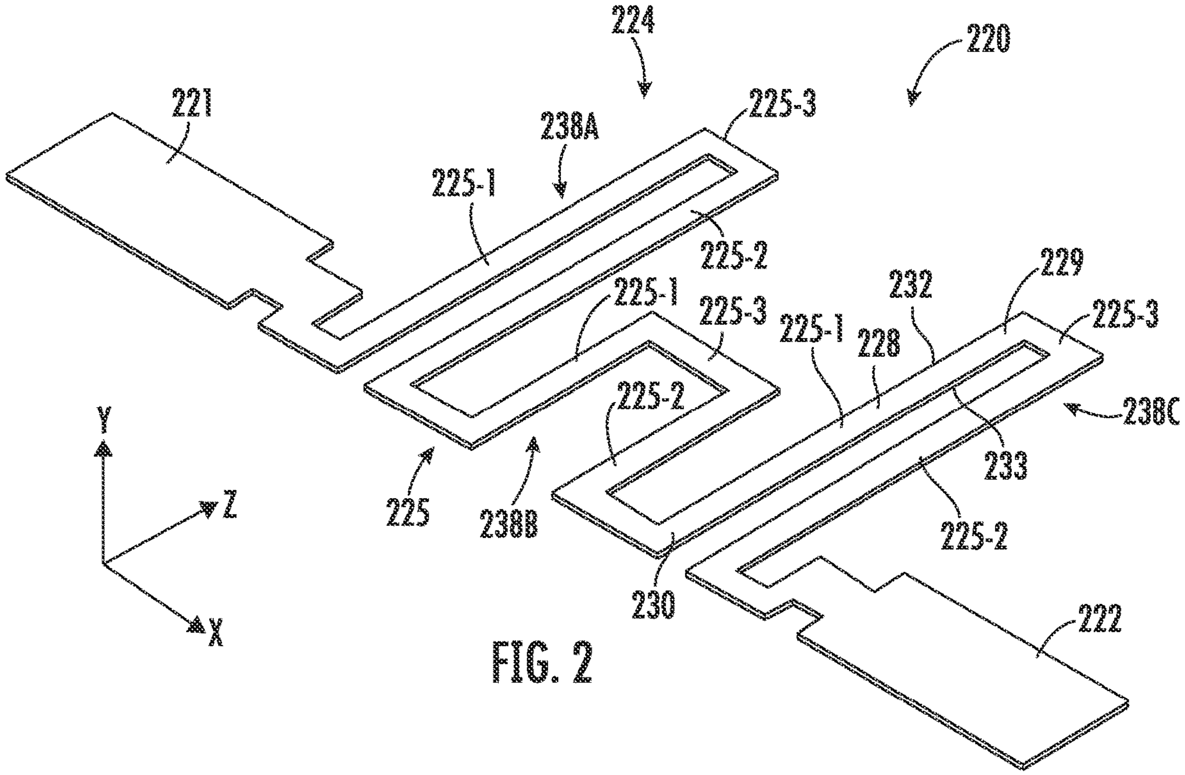
FIG. 2 depicts a perspective view of a fusible element of a protection device, according to embodiments of the present disclosure.

FIG. 2 depicts an example fusible element 220 in greater detail. In some embodiments, the fusible element 220 may be a continuous piece of material (e.g., metal sheet), which is cut, stamped, or otherwise processed into a desired starting configuration. As shown, the fusible element 220 may include a first end 221 opposite a second end 222, and a central section 224 extending between the first and second ends 221, 222. The central section 224 may include a plurality of segments 225 connected end-to-end in an undulating or serpentine configuration. Each segment (e.g., segment 225-1) of the plurality of segments 225 may include a first main side 228 opposite a second main side, a first segment end 229 opposite a second segment end 230, and a first side 232 opposite a second side 233. As shown, each segment 225 is substantially flat and straight, wherein a plane defined by the first main side 228 is parallel to a plane defined by the second main side, and a plane defined by the first side 232 is parallel to a plane defined by the second side 233.

In the pre-formed, or flattened, configuration, the fusible element 220 may have an overall length extending in the x-direction, an overall width extending in the z-direction, and an overall height or thickness extending in the y-direction. In some examples, the overall width of the fusible element 220, e.g., in the central section 124, may be greater than the overall width of the substrate 104 (FIG. 1). In some examples, the overall width of the fusible element 220 may be two times as large as the overall width of the substrate 104. In other examples, the overall width of the fusible element 220 may be at least three times as large as the overall width of the substrate 104.

As further shown, the plurality of segments 225 may include a plurality of pairs 238A-238C of first segments 225-1 and second segments 225-2 each connected at a bend, or third segment 225-3. The third segment 225-3 of pair 238B may correspond to a target fusing location of the fusible element 220. In some embodiments, the first and second segments 225-1, 225-2 are separated from one another by a gap and may extend parallel to one another. Although non-limiting, pairs 238A and 238C may have a width (e.g., along the z-direction) greater than a width of pair 238B. As further shown, a gap between first and second segments 225-1, 225-2 of pair 238B may be greater/larger (e.g., in the x-direction) than a gap between first and second segments 225-1, 225-2 of pairs 238A and 238C. Embodiments herein are not limited in this context.

Figure 3A:
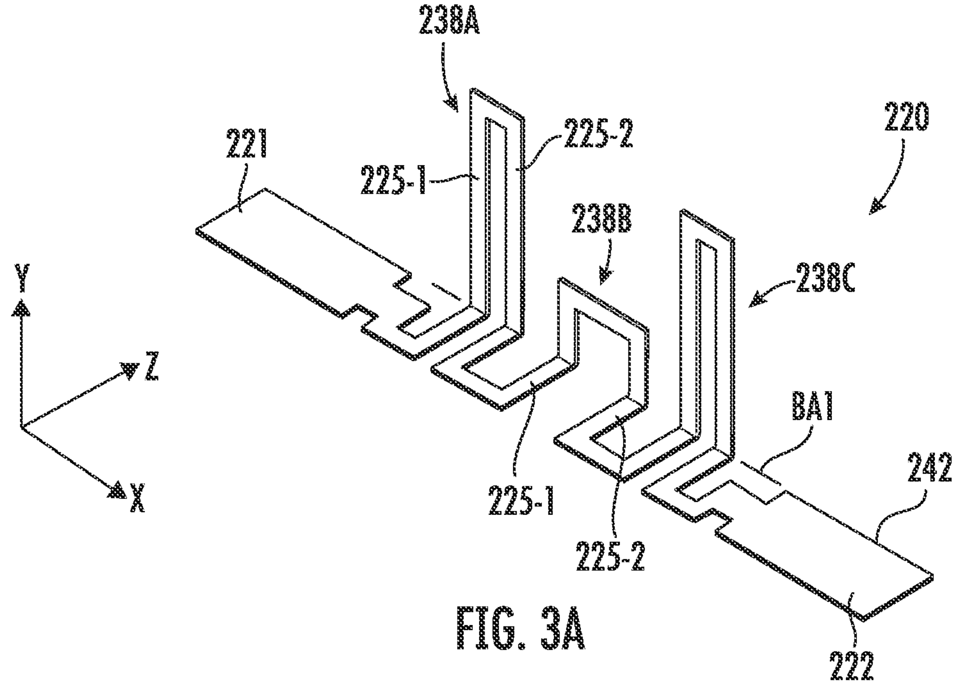
FIGS. 3A-3D depict an approach for forming a fusible element of a protection device, according to embodiments of the present disclosure.

Turning now to FIGS. 3A-3D, one approach for forming or arranging the fusible element 220 will be described. As shown in FIG. 3A, the plurality of pairs 238A-238C of first segments 225-1 and second segments 225-2 may be bent or folded along a first bend axis 'BA1' to extend vertically in the y-direction. In some embodiments, the first bend axis may generally follow or extend along an edge/border 242 of the first and second ends 221, 222 of the fusible element 220. In some embodiments, the bend formed in the first segments 225-1 and second segments 225-2 may be approximately ninety degrees.

Figure 3B:
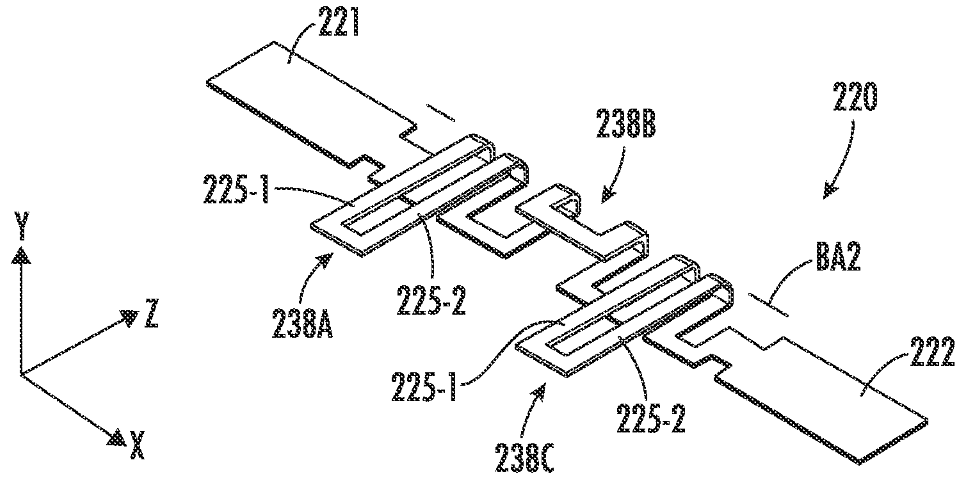

As shown in FIG. 3B, the plurality of pairs 238A-238C of first segments 225-1 and second segments 225-2 may be bent or folded along a second bend axis 'BA2' to extend horizontally in the z-direction. In the non-limiting embodiment shown, the second bend axis may be directly above the first bend axis.

Figure 3C:
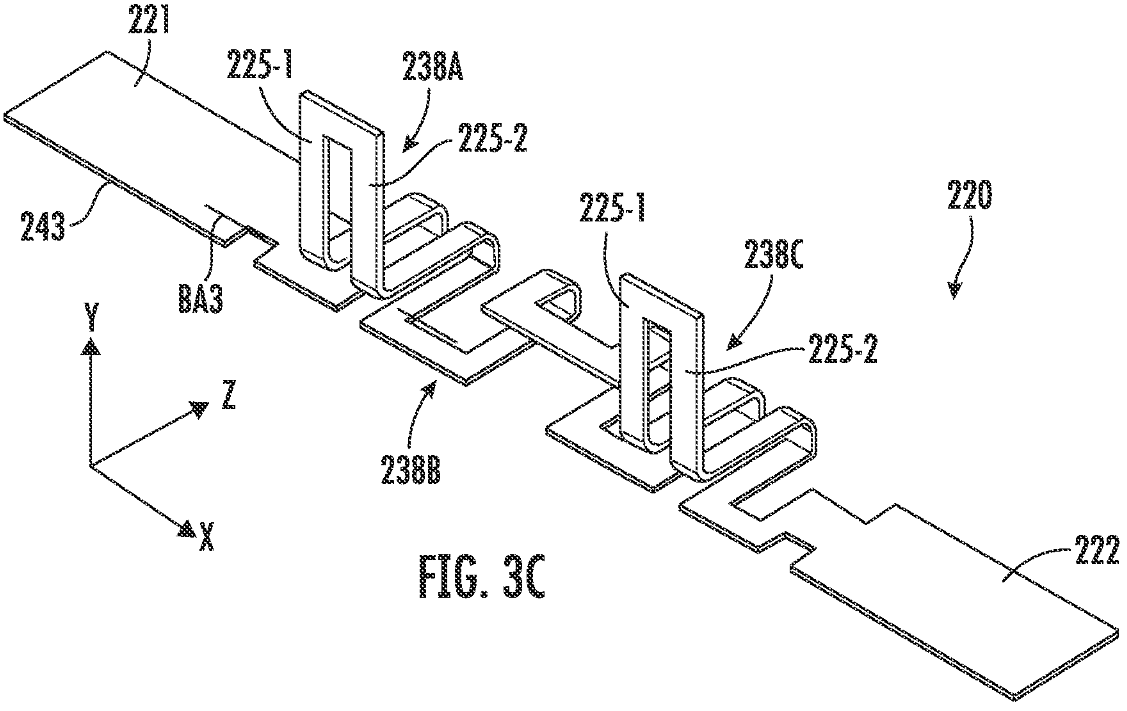

As shown in FIG. 3C, pairs 238A and 238C of first segments 225-1 and second segments 225-2 may be bent or folded along a third bend axis 'BA3' to again extend vertically in the y-direction. In the non-limiting embodiment shown, the third bend axis may be parallel to the second bend axis. Furthermore, the third bend axis may generally follow or extend along a second edge/border 243 of the first and second ends 221, 222 of the fusible element 220. As shown, pair 238B may not be bent about the third bend axis.

Figure 3D:
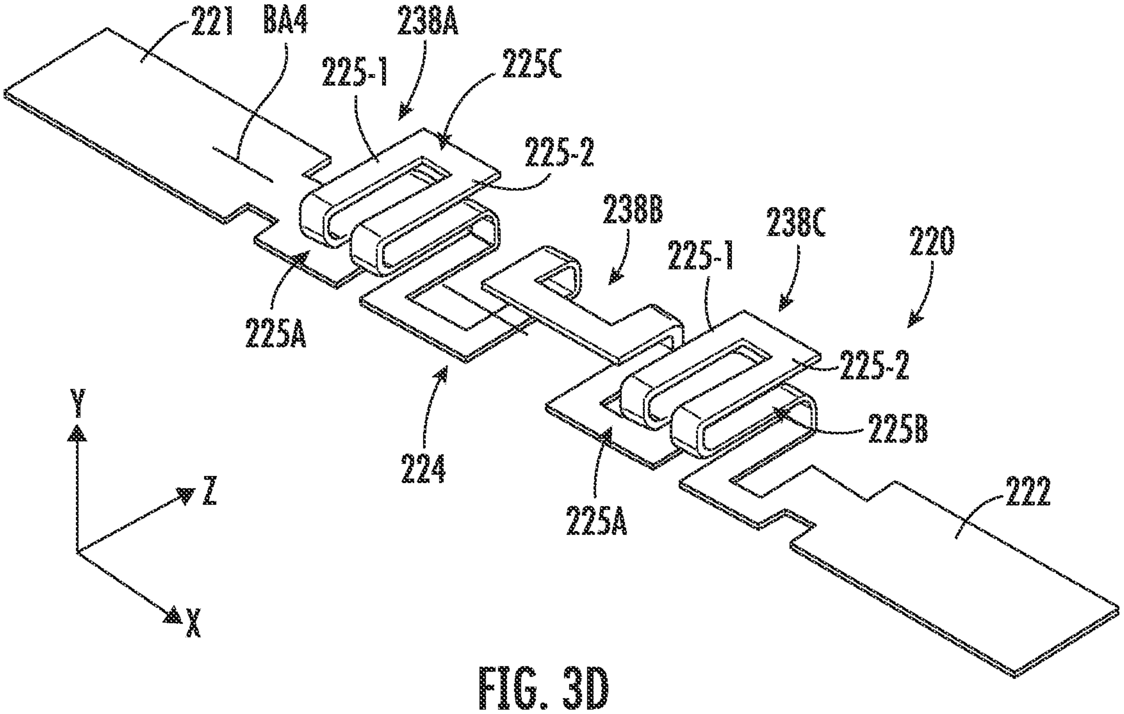

As shown in FIG. 3D, pairs 238A and 238C of first segments 225-1 and second segments 225-2 may be bent or folded along a fourth bend axis 'BA4' to again extend horizontally in the z-direction. In the non-limiting embodiment shown, the fourth bend axis may be directly above the third bend axis. In the configuration shown, the central section 224 of the fusible element 220 may extend along three different vertically stacked planes. For example, a first set of segments 225A may extend along a first plane, wherein the first plane is co-planar with the first and second ends 221, 222. A second set of segments 225B may extend along a second plane, the second set of segments 225B overlapping the first set of segments 225A. A third set of segments 225C may extend a long a third plane, the third set of segments 225C overlapping the second set of segments 225B. Said differently, the first plane may be located a first distance from the upper surface 105 of the substrate 104 (FIG. 1), the second plane may be located a second distance from the upper surface 105 of the substrate 104, and the third plane may be located a third distance from the upper surface 105 of the substrate 104. The third distance>the second distance>the first distance. It will be appreciated that a greater or lesser number of bends may be possible along the central section 224 of the fusible element 220.

Figure 4A:
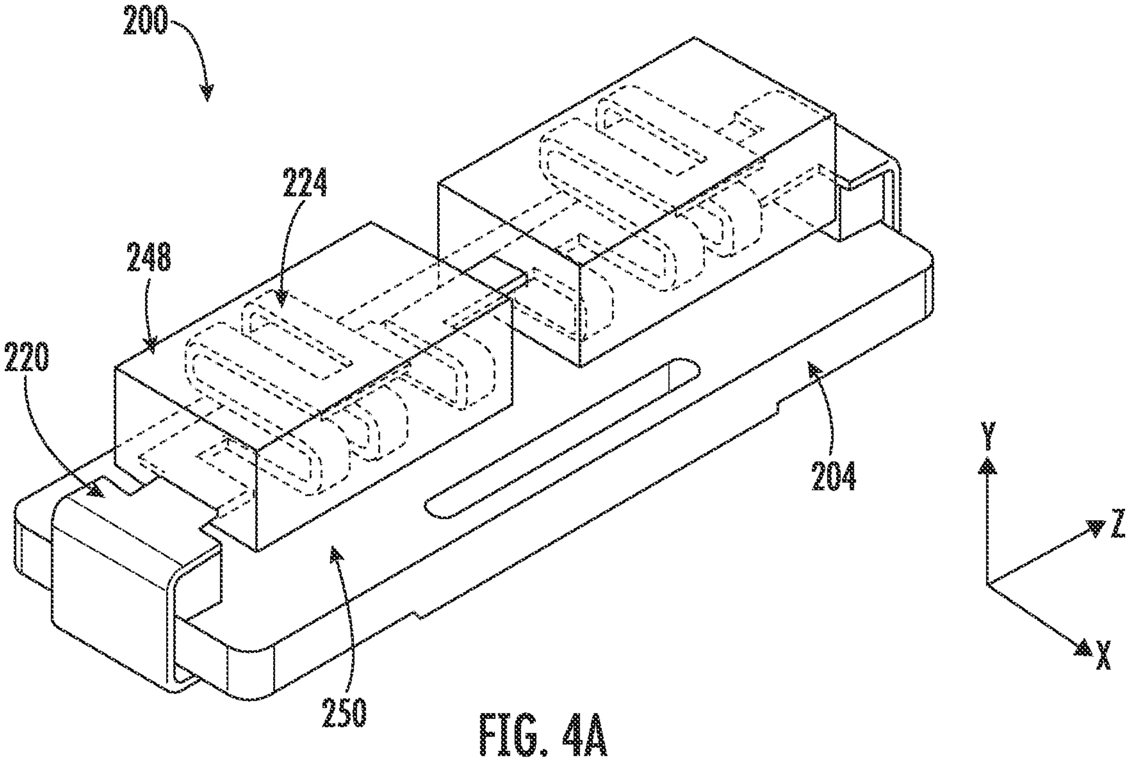
FIG. 4A depicts a perspective view of a protection device including a filler material, according to embodiments of the present disclosure.
Figure 4B:
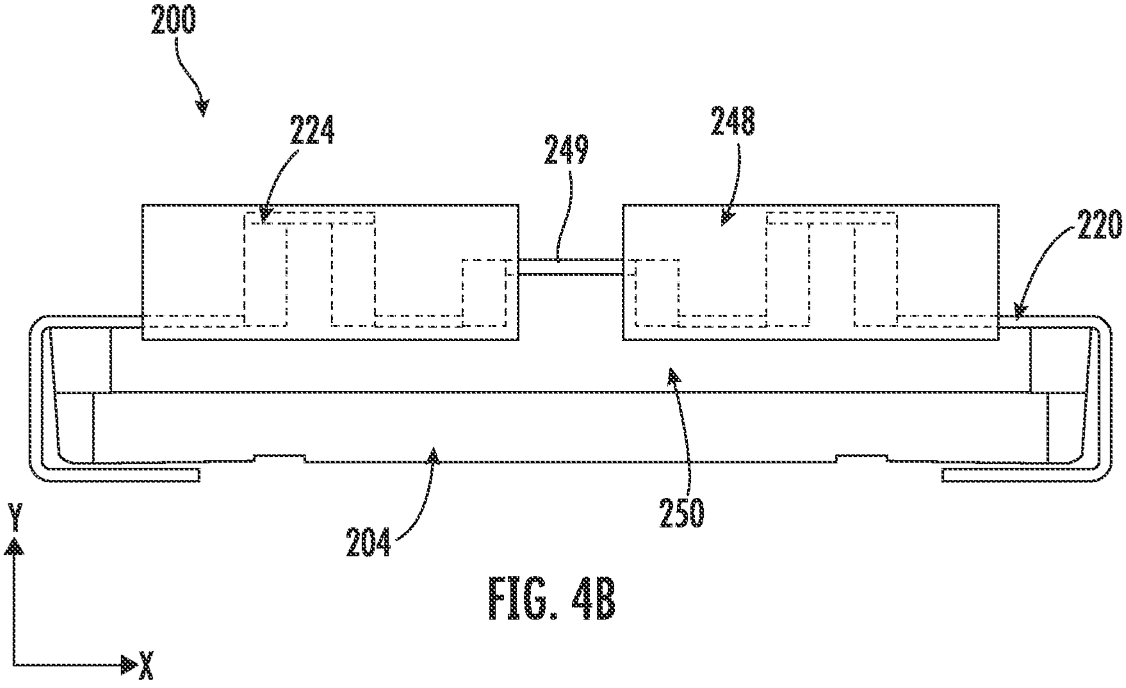
FIG. 4B depicts a side view of the protection device of FIG. 4A including the filler material, according to embodiments of the present disclosure.

As shown in the device 200 of FIGS. 4A-4B, the fusible element 220 may be coupled to a substrate 204, and a filler material 248 may be formed over the fusible element 220. In some embodiments, the filler material 248, which may be a silicone or an adhesive/polymer in paste form, may be selectively applied on both ends of the central section 224, leaving a target fusing location 249 uncovered. The target fusing location 249 serves as a weakened spot along the fusible element 220. As shown, a gap 250 may remain between the filler material 248 and the substrate 204.

Figure 5A:
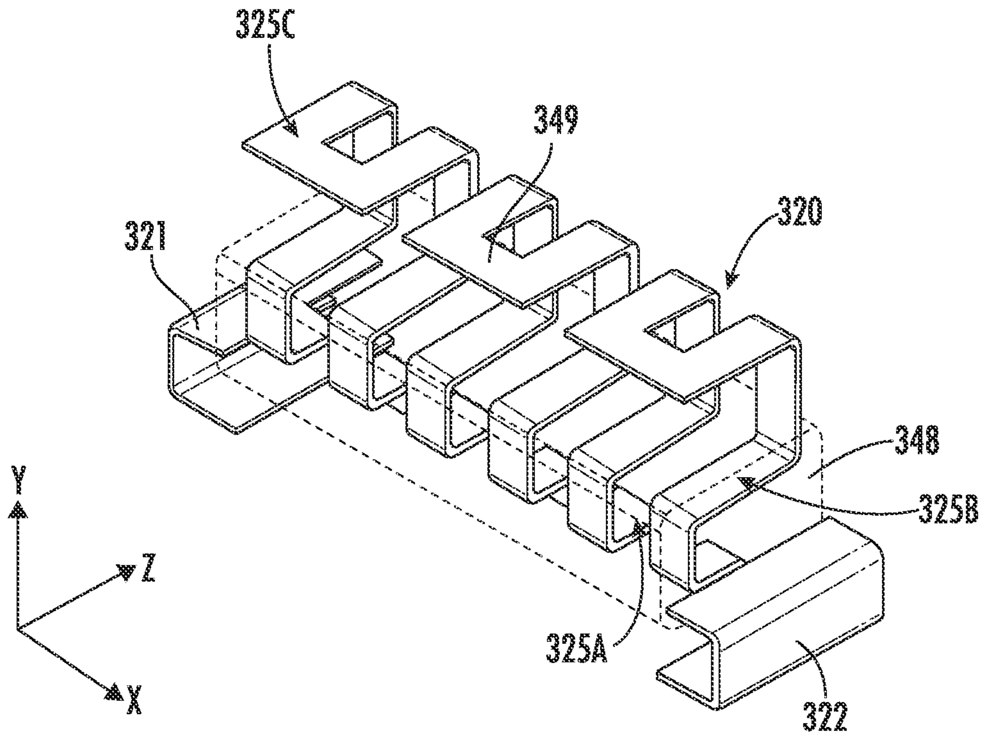
FIGS. 5A-5B depict protection devices including a filler material, according to embodiments of the present disclosure.

In the embodiment of FIG. 5A, a filler material 348 may extend entirely between a first end 321 and a second end 322 of a fusible element 320. Furthermore, the filler material 348 may cover a first set of segments 325A extending along a first plane and a second set of segments 325B extending along a second plane. A third set of segments 325C extending along a third plane may remain uncovered by the filler material 348. In this embodiment, a target fusing location 349 may be located along one or more of the third set of segments 325C.

Figure 5B:
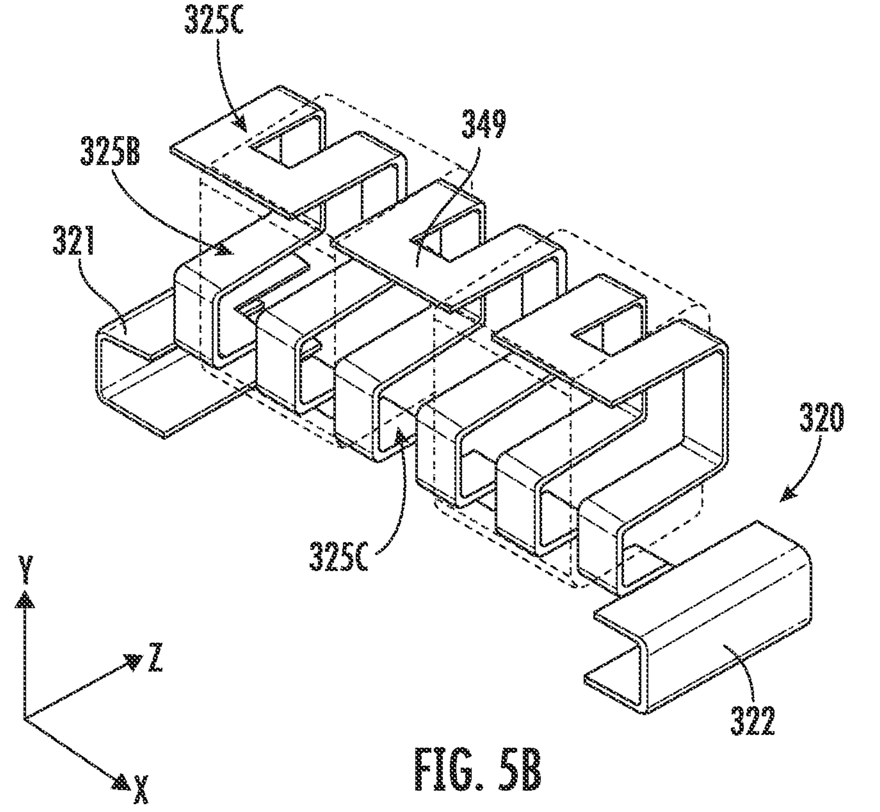

In the embodiment of FIG. 5B, the filler material 348 may be separated into two or more sections, wherein the target fusing location 349 is located between the sections. In this embodiment, the filler material 348 may partially cover the first set of segments 325A, the second set of segments 325B, and the third set of segments 325C. The filler material 348 may take on different configurations in other embodiments.

Figure 6A:
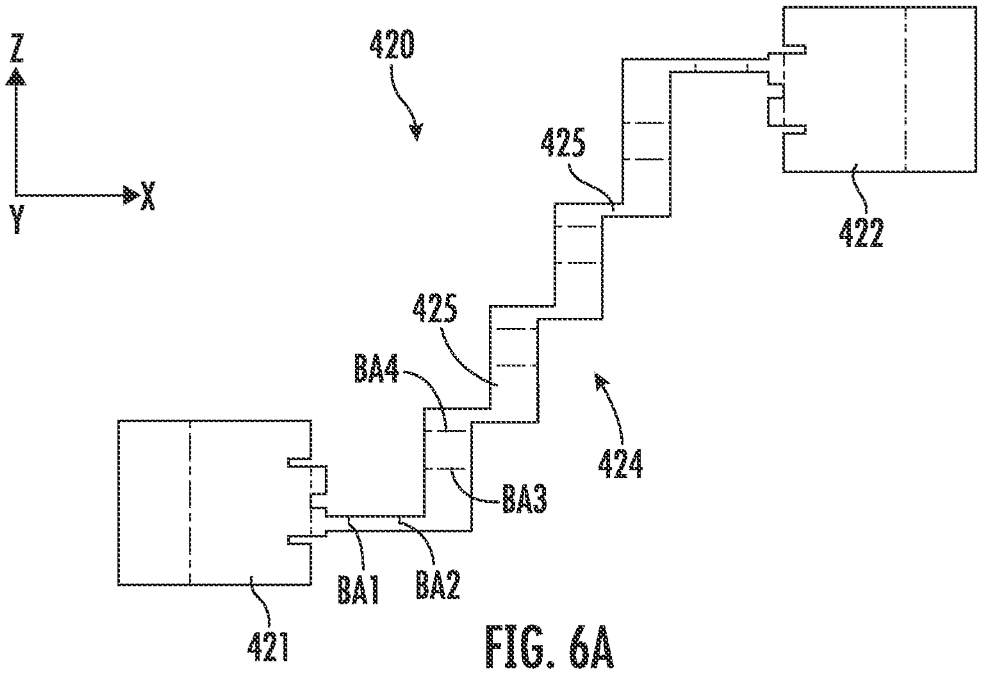
FIG. 6A is a top view of a fusible element of a protection device, according to embodiments of the present disclosure.
Figure 6B:
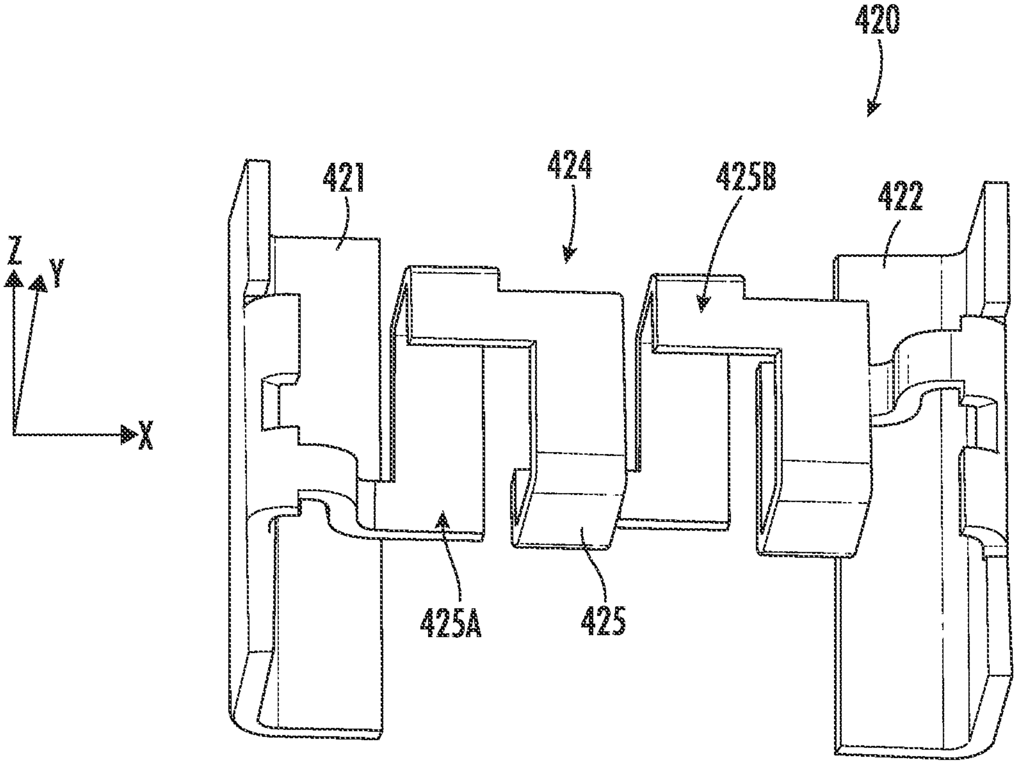
FIG. 6B is a perspective view of the fusible element of FIG. 6A, according to embodiments of the present disclosure.

FIG. 6A depicts a top view and FIG. 6B depicts a perspective view of another example fusible element 420 according to embodiments of the present disclosure. The fusible element 420 may include a first end 421 opposite a second end 422, and a central section 424 extending between the first and second ends 421, 422. In the pre-bent, initial configuration of FIG. 6A, the first and second ends 421, 422 may be offset with respect to one another in both the x-direction and the z-direction. Meanwhile, the central section 424 may include a plurality of segments 425 arranged in a stairstep configuration between the first and second ends 421, 422. As shown, those segments 425 generally extending in the x-direction include multiple bend or inflection points, wherein the bend axes (e.g., BA1, BA2) are oriented parallel to the z-direction. Those segments 425 generally extending in the z-direction may also include multiple bend or inflection points, wherein the bend axes (e.g., BA3, BA4) are oriented parallel to the x-direction. In the bent, final configuration of FIG. 6B, the plurality of segments 425 may include a first set of segments 425A extending along a first plane and a second set of segments 425B extending along a second plane. The second set of segments 425B may extend over, and parallel to, the first set of segments 425A.

Figure 7A:
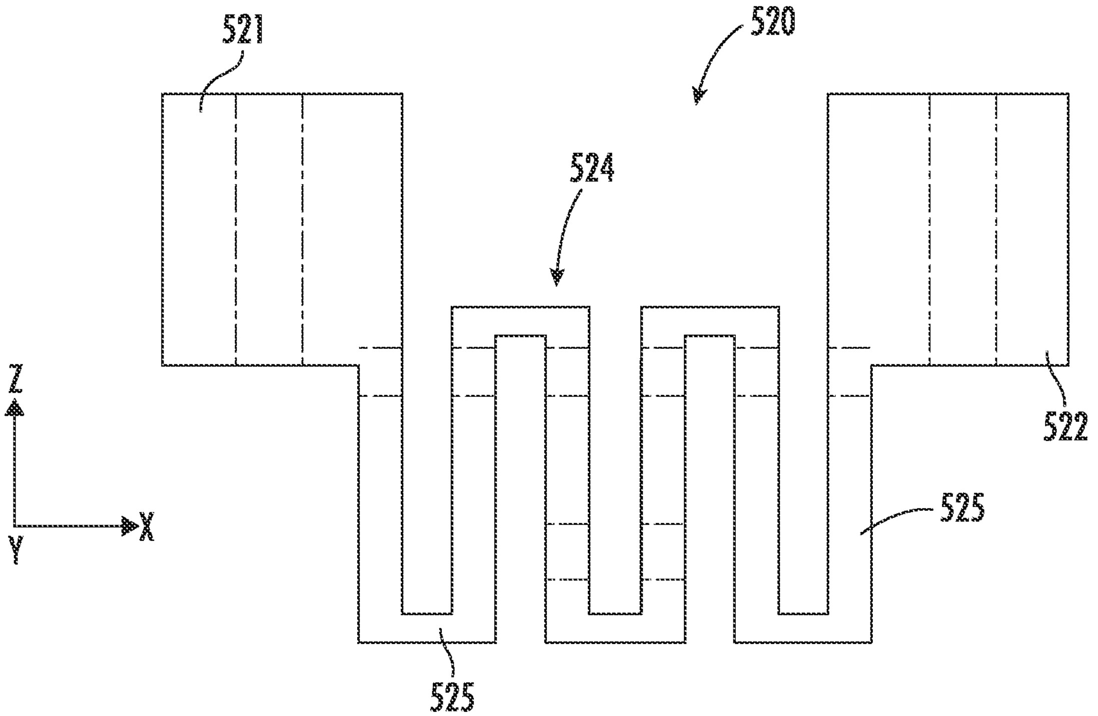
FIG. 7A is a top view of a fusible element of a protection device, according to embodiments of the present disclosure.
Figure 7B:
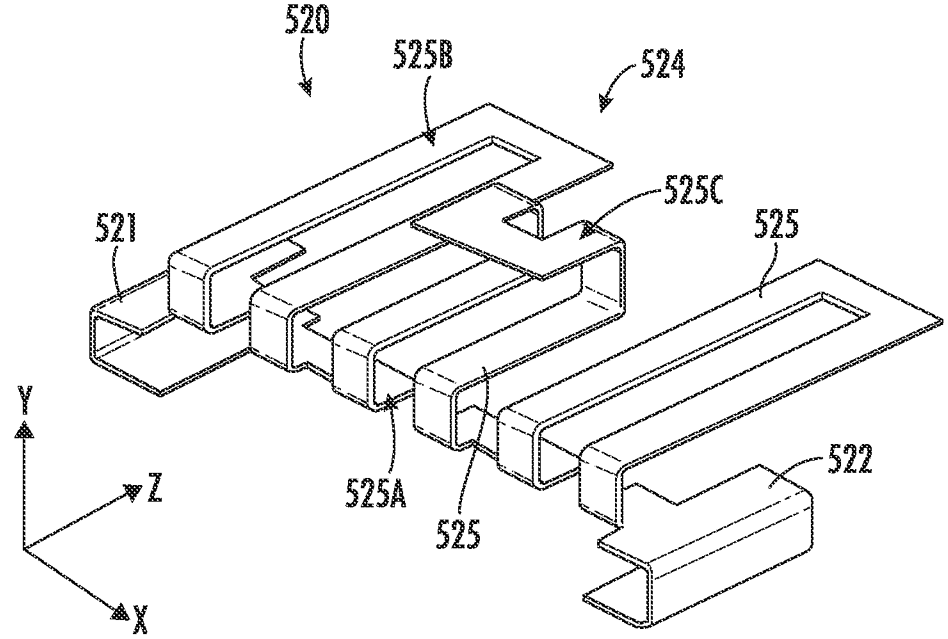
FIG. 7B is a perspective view of the fusible element of FIG. 7A, according to embodiments of the present disclosure.

FIG. 7A depicts a top view and FIG. 7B depicts a perspective view of another example fusible element 520 according to embodiments of the present disclosure. The fusible element 520 may include a first end 521 opposite a second end 522, and a central section 524 extending between the first and second ends 521, 522. In the pre-bent, initial configuration of FIG. 7A, the first and second ends 521, 522 may be offset with respect to one another in the x-direction. Meanwhile, the central section 524 may include a plurality of segments 525 arranged in an undulating or serpentine configuration between the first and second ends 521, 522. As shown, the segments 525 may include a plurality of bends or inflection points. In the bent, final configuration of FIG. 7B, the plurality of segments 525 may include a first set of segments 525A extending along a first plane, a second set of segments 525B extending along a second plane, and a third set of segments 525C extending along a third plane.

Figure 8A:
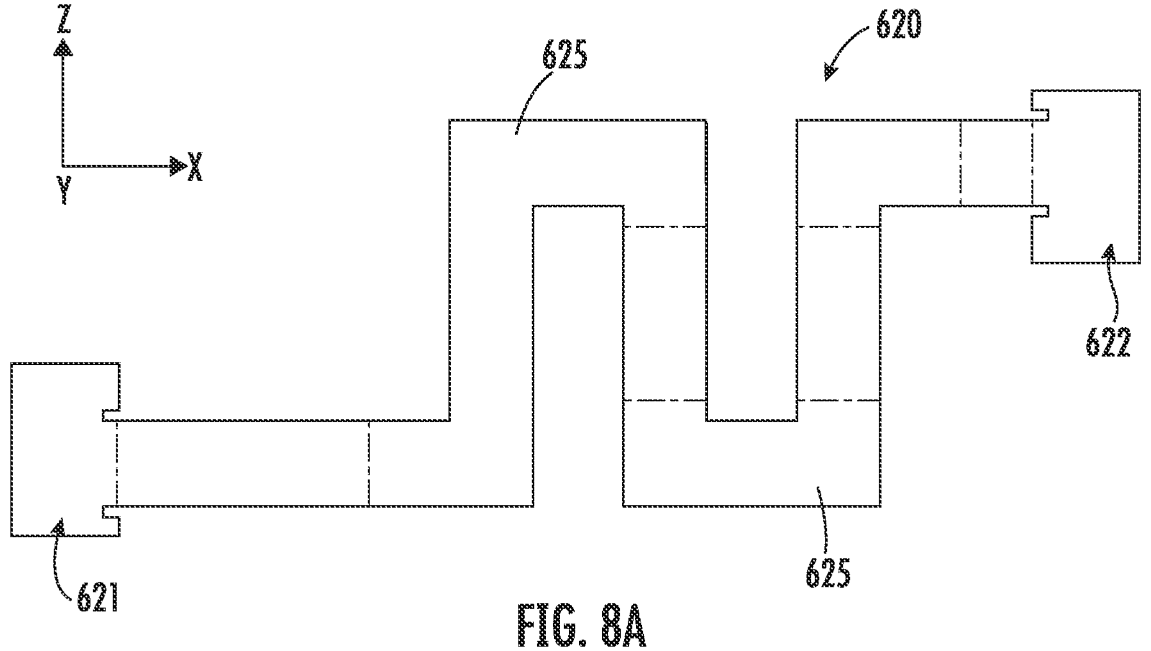
FIG. 8A is a top view of a fusible element of a protection device, according to embodiments of the present disclosure.
Figure 8B:
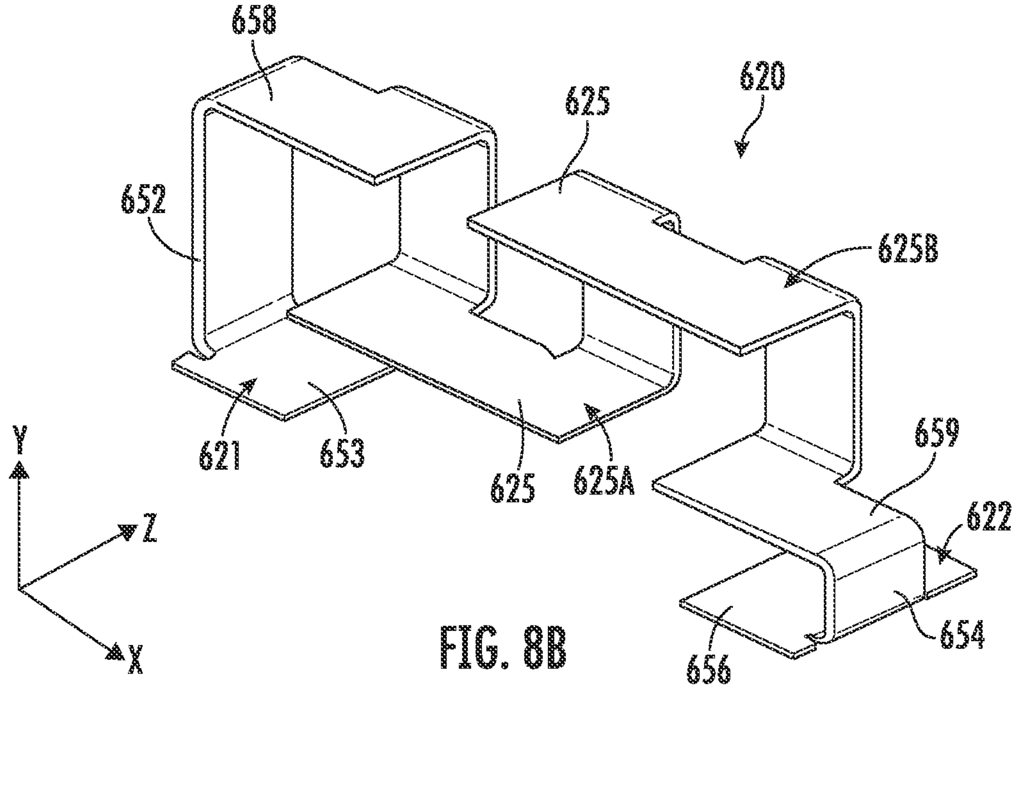
FIG. 8B is a perspective view of the fusible element of FIG. 8A, according to embodiments of the present disclosure.

FIG. 8A depicts a top view and FIG. 8B depicts a perspective view of another example fusible element 620 according to embodiments of the present disclosure. The fusible element 620 may include a first end 621 opposite a second end 622, and a central section 624 extending between the first and second ends 621, 622. In the pre-bent, initial configuration of FIG. 8A, the first and second ends 621, 622 may be offset with respect to one another in both the x-direction and the z-direction. Meanwhile, the central section 624 may include a plurality of segments 625 arranged in an undulating or serpentine configuration between the first and second ends 621, 622. As shown, the segments 625 may include a plurality of bends or inflection points. In the bent, final configuration of FIG. 8B, the plurality of segments 625 may include a first set of segments 625A extending along a first plane and a second set of segments 625B extending along a second plane. The second set of segments 625B may extend over, and parallel to, the first set of segments 625A.

In this embodiment, the first and second ends 621, 622 may be asymmetrical. For example, a side segment 652 extending from a base segment 653 of the first end 621 may have a different height (e.g., along the y-direction) than a height of a second side segment 654 extending from a base segment 656 of the second end 622. Said another way, an upper segment 658 of the first end 621 and an upper segment 659 of the second end 622 may extend along a different planes.

Figure 9A:
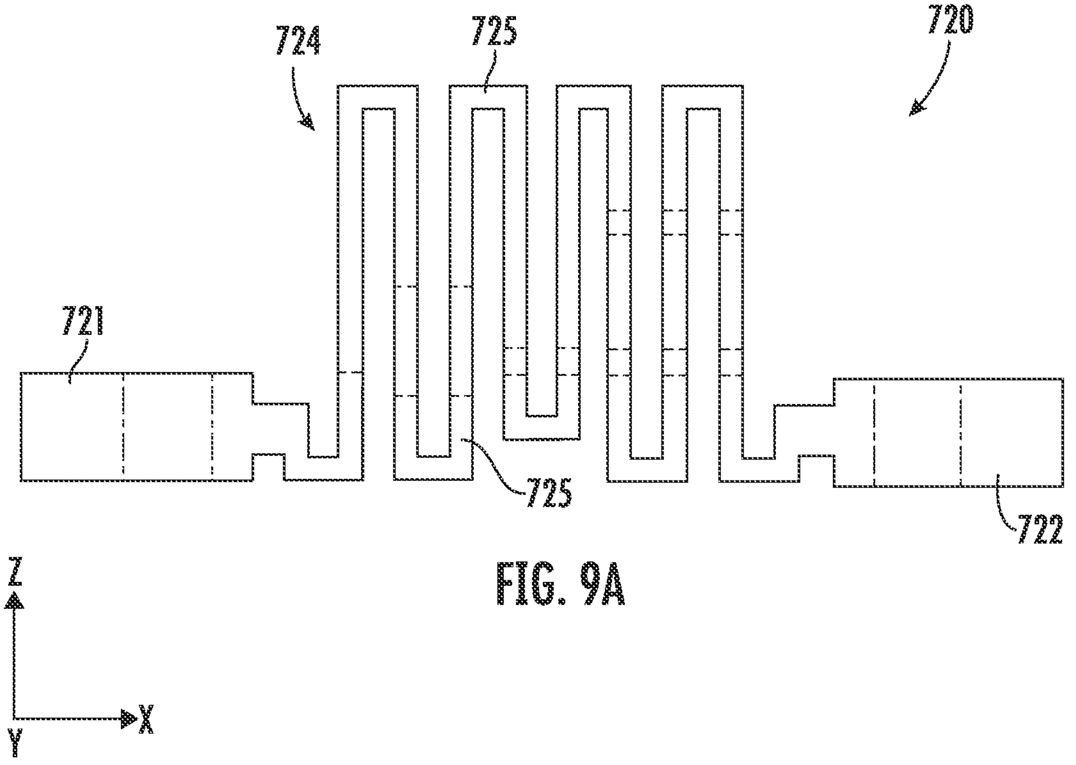
FIG. 9A is a top view of a fusible element of a protection device, according to embodiments of the present disclosure.
Figure 9B:
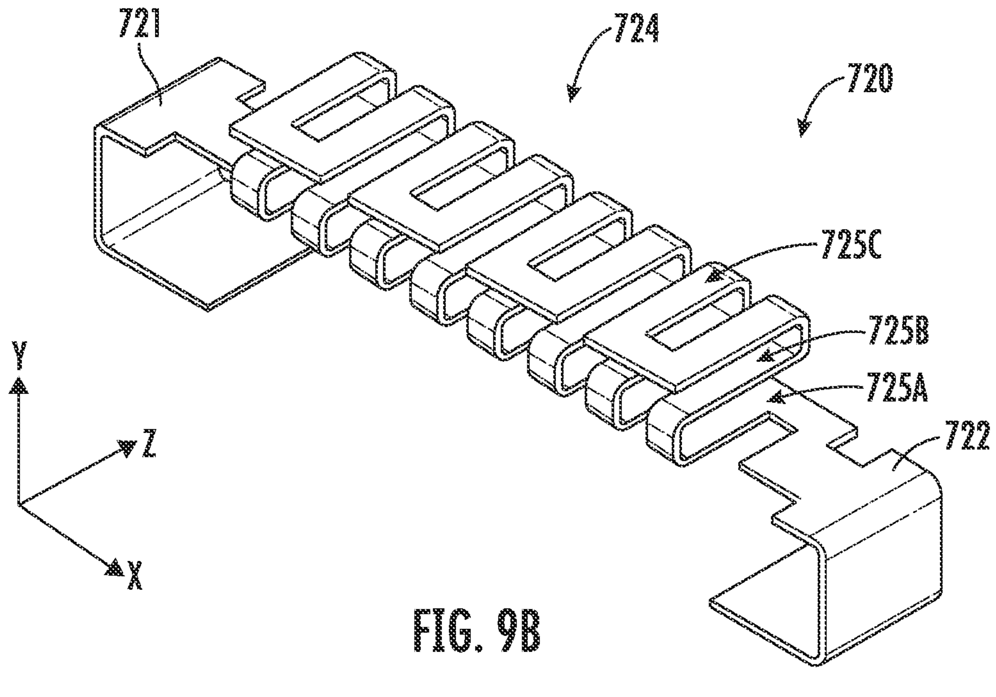
FIG. 9B is a perspective view of the fusible element of FIG. 9A, according to FIG. 10A is a top view of a fusible element of a protection device, according to embodiments of the present disclosure.

FIG. 9A depicts a top view and FIG. 9B depicts a perspective view of another example fusible element 720 according to embodiments of the present disclosure. The fusible element 720 may include a first end 721 opposite a second end 722, and a central section 724 extending between the first and second ends 721, 722. The central section 724 may include a plurality of segments 725 arranged in an undulating or serpentine configuration between the first and second ends 721, 722. As shown, the segments 725 may include a plurality of bends or inflection points. In the bent, final configuration of FIG. 9B, the plurality of segments 725 may include a first set of segments 725A extending along a first plane, a second set of segments 725B extending along a second plane, and a third set of segments 725C extending along a third plane.

Figure 10A:
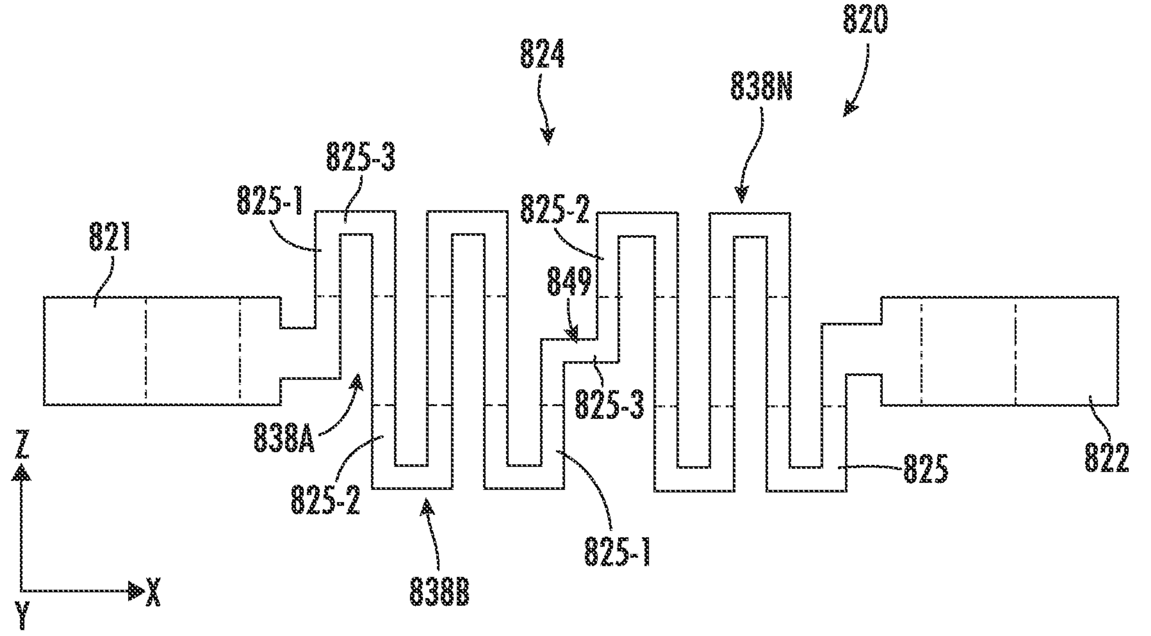
FIGS. 10B-10D depict approaches for forming the fusible element of the protection device of FIG. 10A, according to embodiments of the present disclosure.

FIG. 10A depicts a top view of another example fusible element 820 according to embodiments of the present disclosure. The fusible element 820 may include a first end 821 opposite a second end 822, and a central section 824 extending between the first and second ends 821, 822. The central section 824 may include a plurality of segments 825 arranged in an undulating or serpentine configuration between the first and second ends 821, 822. As shown, the segments 825 may include a plurality of bends or inflection points. Furthermore, the segments 825 may be arranged as a plurality of pairs 838A-838N of first segments 825-1 and second segments 825-2 each connected at a bend, or third segment 825-3. In some embodiments, one or more third segments 825-3 may correspond to a target fusing location 849 of the fusible element 820. As shown, the first segment 825-1 and second segment 825-2 connected at the target fusing location 849 may extend in opposite directions (e.g., along the z-direction).

Figure 10B:
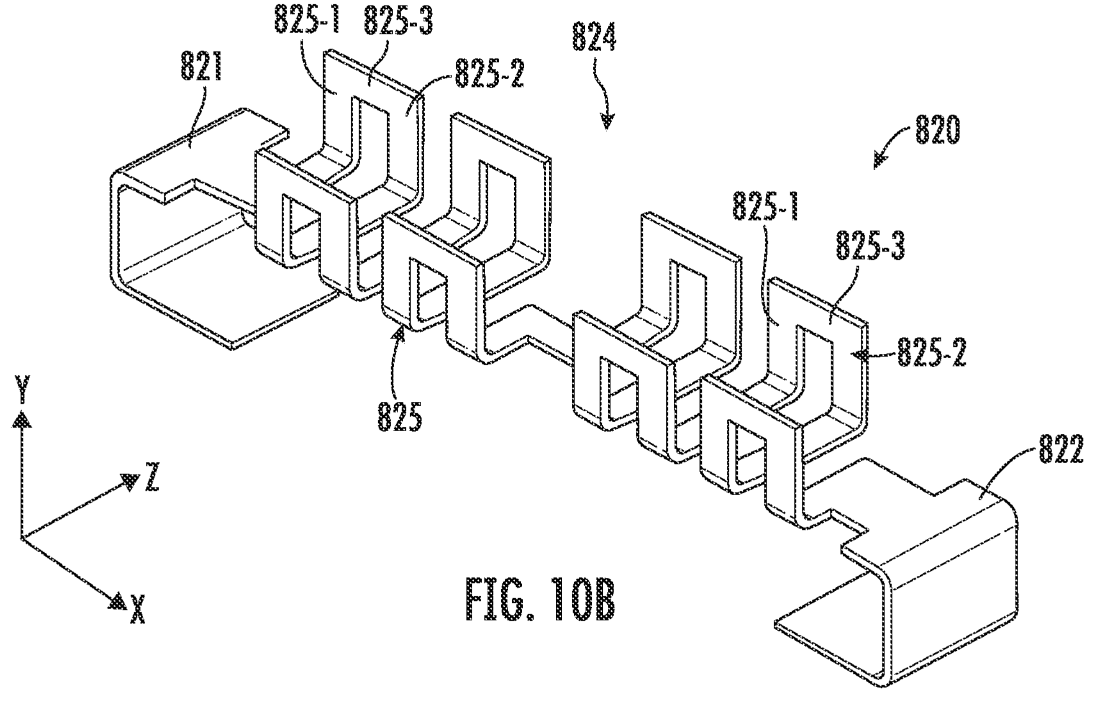
Figure 10C:
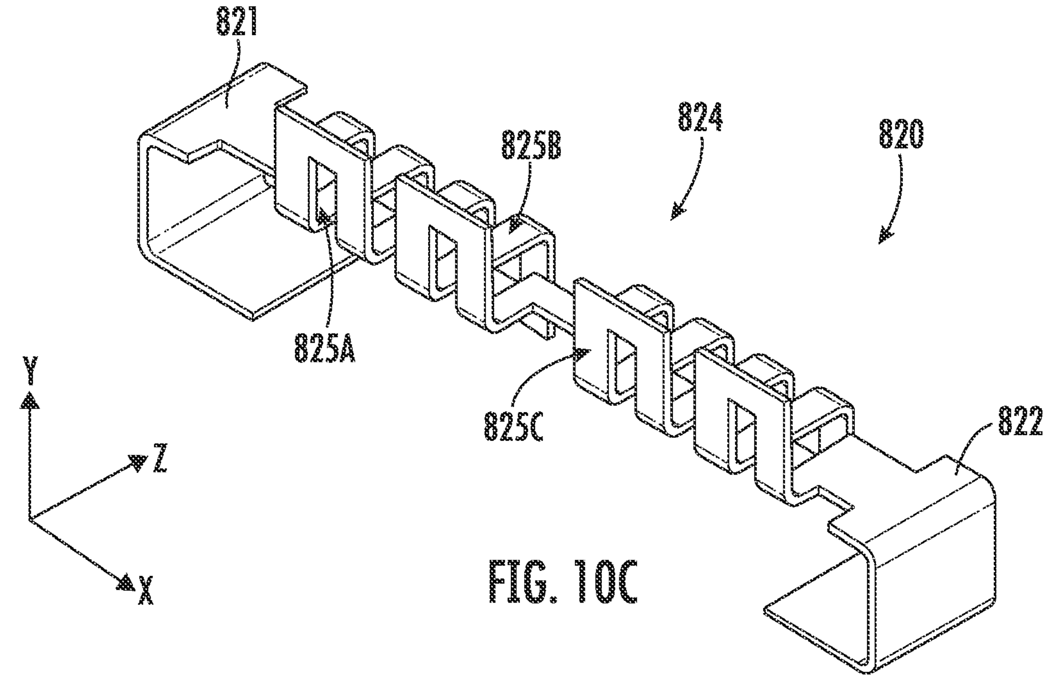

In the bent configuration of FIG. 10B, each of the first segments 825-1 and the second segments 825-2 may be bent to extend vertically, e.g., in the y-direction. As shown, each of the first segments 825-1 and the second segments 825-2 may include a first portion extending along a first plane and a second section extending along a second plane, wherein the first and second planes are perpendicular to one another. Formation of the fusible element 820 may end, or a subset of the first segments 825-1 and the second segments 825-2 may be further bent, as shown in FIG. 10C. As shown, the third segments along one side of the fusible element 820 may be folded towards the opposite side. In this configuration, the segments 825 may include a first set of segments 825A extending along a first plane, a second set of segments 825B extending along a second plane, and a third set of segments 825C extending along a third plane, wherein the third plane is perpendicular the first and second planes.

Figure 10D:
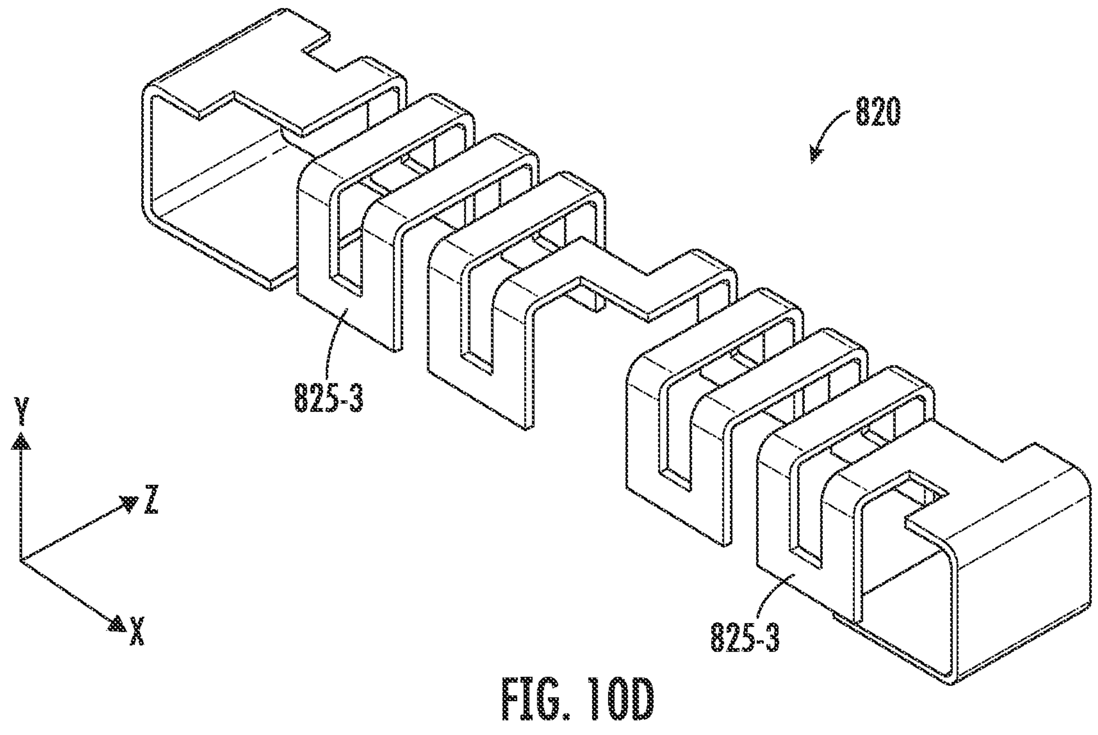

FIG. 10D depicts another possible way to configure the fusible element 820 of FIG. 10A. In this case, the third segments 825-3 extend down towards the substrate (not shown).

Figure 11A:
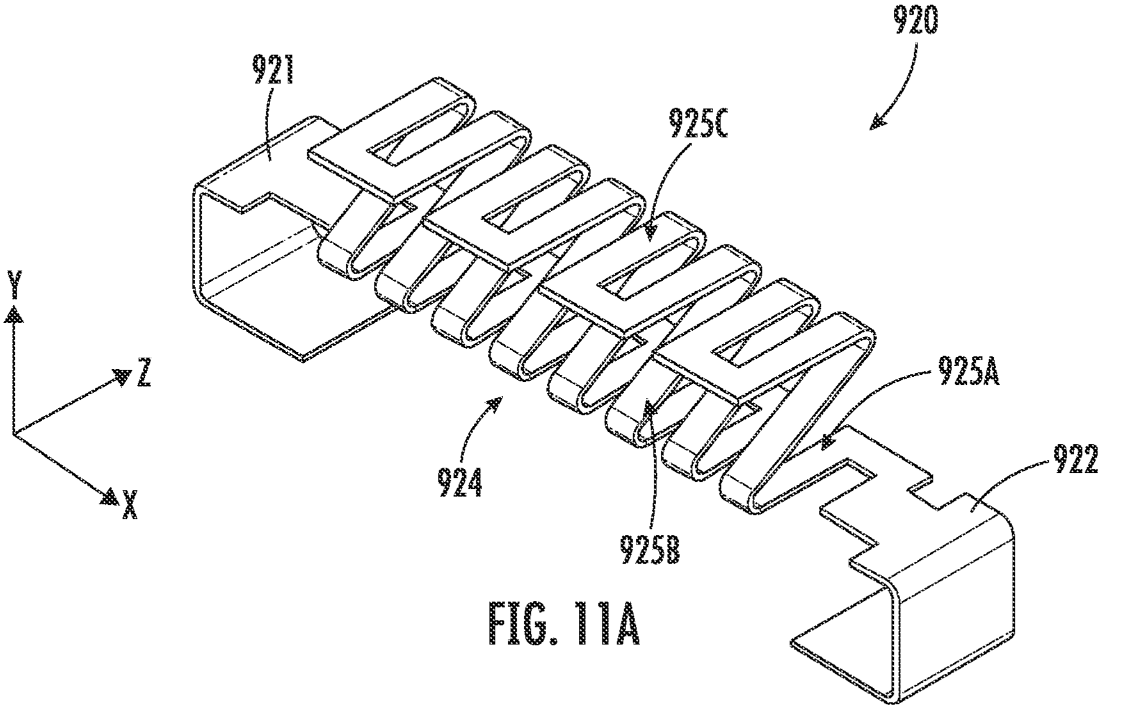
FIG. 11A is a perspective view of a fusible element of a protection device, according to embodiments of the present disclosure.
Figure 11B:
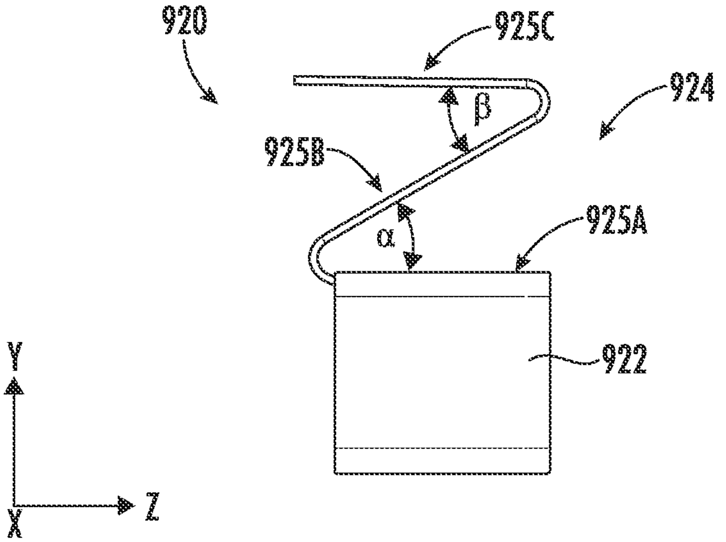
FIG. 11B is a side view of the fusible element of FIG. 11A, according to embodiments of the present disclosure.

FIG. 11A depicts a perspective view and FIG. 11B depicts a side view of another example fusible element 920 according to embodiments of the present disclosure. The fusible element 920 may include a first end 921 opposite a second end 922, and a central section 924 extending between the first and second ends 921, 922. The central section 794 may include a plurality of segments 925 arranged in an undulating or serpentine configuration between the first and second ends 921, 922. As shown, the segments 925 may include a plurality of bends or inflection points. In the bent, final configuration, the plurality of segments 925 may include a first set of segments 925A extending along a first plane, a second set of segments 925B extending along a second plane, and a third set of segments 925C extending along a third plane. As best shown in FIG. 11B, the second set of segments 925B may extend at a non-zero angle of inclination 'α' relative to the first set of segments 925A. The third set of segments 925C may extend at a second non-zero angle of inclination 'β' relative to the second set of segments 925B. As shown, the first and second angles of inclination may be less than 90°. In various embodiments, the first and second angles of inclination may be the same or different. Furthermore, the first and third planes may extend parallel to one another, as shown, or at a non-zero angle relative to one another. Embodiments herein are not limited in this context.

In sum, embodiments of the present disclosure provide a folded fusible element, which decreases an overall fuse footprint while enabling a higher I2t value for a same low-current rating of planar stamped fusible element. It has been found that the folded fusible element herein may provide approximately 68% longer element length with the same cross-sectional area.

As used herein, an element or step recited in the singular and proceeded with the word "a" or "an" is understood as not excluding plural elements or steps, unless such exclusion is explicitly recited. Furthermore, references to "one embodiment" of the present disclosure are not intended to be interpreted as excluding the existence of additional embodiments also incorporating the recited features.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions and are both conjunctive and disjunctive in operation. For example, expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are just used for identification purposes to aid the reader's understanding of the present disclosure. The directional references do not create limitations, particularly as to the position, orientation, or use of the disclosure. Connection references (e.g., attached, coupled, connected, and joined) are to be construed broadly and may include intermediate members between a collection of elements and relative movement between elements unless otherwise indicated. As such, connection references do not necessarily infer two elements are directly connected and in fixed relation to each other.

Furthermore, identification references (e.g., primary, secondary, first, second, third, fourth, etc.) are not intended to connote importance or priority, and are used to distinguish one feature from another. The drawings are for purposes of illustration, and the dimensions, positions, order and relative sizes reflected in the drawings attached hereto may vary.

Furthermore, the terms "substantial" or "approximately," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

While certain embodiments of the disclosure have been described herein, the disclosure is not limited thereto, as the disclosure is as broad in scope as the art will allow and the specification may be read likewise. Therefore, the above description is not to be construed as limiting. Instead, the above description is merely as exemplifications of particular embodiments. Those skilled in the art will envision other modifications within the scope and spirit of the claims appended hereto.

What is claimed is:

1. A protection device, comprising:

a substrate; and a fusible element coupled to the substrate, the fusible element comprising:

a first end opposite a second end, wherein the first and second ends wrap around the substrate; and a central section comprising a plurality of segments connected end-to-end in a continuous arrangement between the first and second ends, wherein a first set of segments of the plurality of segments extends along a first plane, and wherein a second set of segments of the plurality of segments extends along a second plane, different than the first plane, wherein the plurality of segments comprises a plurality of pairs of first and second segments connected at a third segment, wherein the first and second segments extend parallel to one another, wherein the first and second segments extend perpendicular to the third segment, wherein the third segment includes a first main side opposite a second main side, and wherein the first main side defines a segment plane extending parallel to a substrate plane defined by an upper surface of the substrate.

2. The protection device of claim 1, wherein the first plane is a first distance, along a first direction, from the upper surface of the substrate, and wherein the second plane is a second distance, along the first direction, from the upper surface of the substrate.

3. The protection device of claim 2, wherein the second set of segments of the plurality of segments extends in a second direction and overlaps the first set of segments of the plurality of segments.

4. The protection device of claim 3, wherein the second direction is orthogonal to the first direction.

5. The protection device of claim 3, wherein an interior angle formed between the first direction and the second direction is less than 90 degrees.

6. The protection device of claim 1, further comprising a third set of segments, wherein the third set of segments extends along a third plane, and wherein the third plane is different than the first plane and the second plane.

7. The protection device of claim 1, further comprising a filler material extending over a portion of the central section of the fusible element.

8. The protection device of claim 1, further comprising a first filler material and a second filler material formed over the central section of the fusible element, wherein a target fusing location of the central section of the fusible element remains uncovered by the first filler material and the second filler material.

9. The protection device of claim 1, wherein each segment of the plurality of first and second segments includes a first main side opposite a second main side, a first segment end opposite a second segment end, and a first side opposite a second side, wherein a plane defined by the first main side of the first and second segments is parallel to a plane defined by the second main side of the first and second segments.

* * * * *